Sept. 2, 1958   M. S. CLARK   2,850,298
QUICK DETACHABLE COUPLING
Filed June 1, 1954   2 Sheets-Sheet 1

INVENTOR.
MALCOLM S. CLARK
BY
Woodling and Krost
Attys.

Sept. 2, 1958  M. S. CLARK  2,850,298
QUICK DETACHABLE COUPLING
Filed June 1, 1954  2 Sheets-Sheet 2

INVENTOR.
MALCOLM S. CLARK
BY
Woodling and Krost
Attys.

United States Patent Office 2,850,298
Patented Sept. 2, 1958

2,850,298

QUICK DETACHABLE COUPLING

Malcolm S. Clark, Union City, Pa., assignor to Snap-Tite, Inc.

Application June 1, 1954, Serial No. 433,650

2 Claims. (Cl. 284—19)

This invention relates to new and useful improvements in couplings for the conducting of fluids under pressure, and which are composed essentially of male and female members which can be coupled and uncoupled with dispatch, and an important object of the invention is to improve the construction of the coupling disclosed in my copending application, Serial No. 390,594, filed November 5, 1953.

Another important object of the invention is the provision of a coupling which will preclude any spray of the fluid therefrom to the exterior thereof while the members are being coupled or connected and which will reduce to a minimum the amount of spillage or leakage of the fluid from the coupling while the members are being uncoupled or disconnected.

Another object is the provision of novel valving for the male and female members of the coupling which does not retard the flow of fluid therethrough when the members are coupled and the valving is opened, but which prevents the flow of fluid when the members are uncoupled and the valving is automatically closed.

Another object of the invention is the provision of sealing means so arranged in the female member as to seal against the male member as the latter is being coupled and prior to the automatic opening of the valving, and also while the male member is being uncoupled and until the valving automatically closes.

A still further object is the provision of a novel type of valve body and seat for the members which will not restrict or retard the full flow of fluid through the coupling when its members are coupled or connected.

Other objects and a fuller understanding of this invention may be had by referring to the following description and claims, taken in conjunction with the accompanying drawings, in which:

Figure 1:
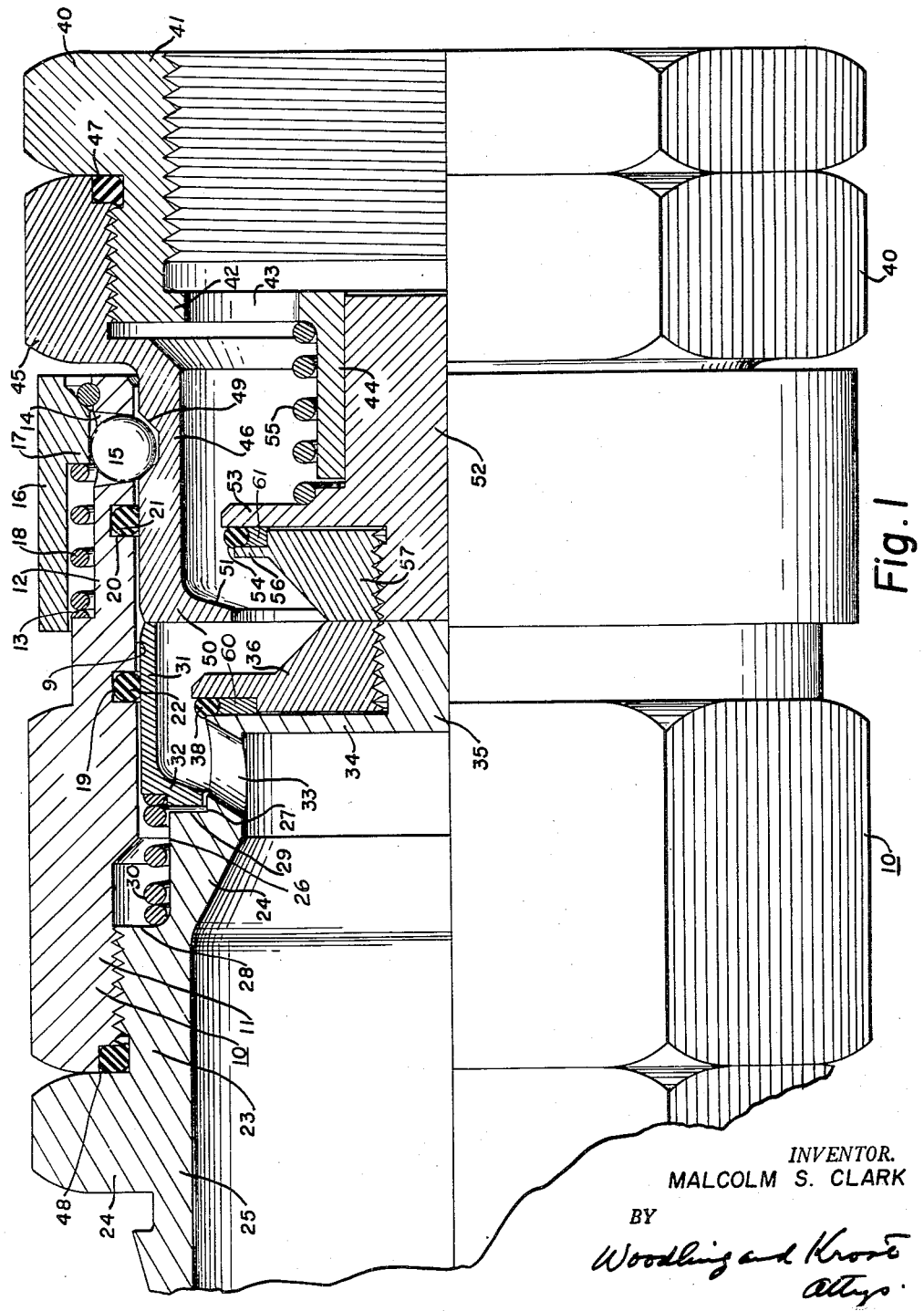
Figure 1 is a side elevation of the coupling in coupled position with the upper half thereof shown in longitudinal section.
Figure 2:
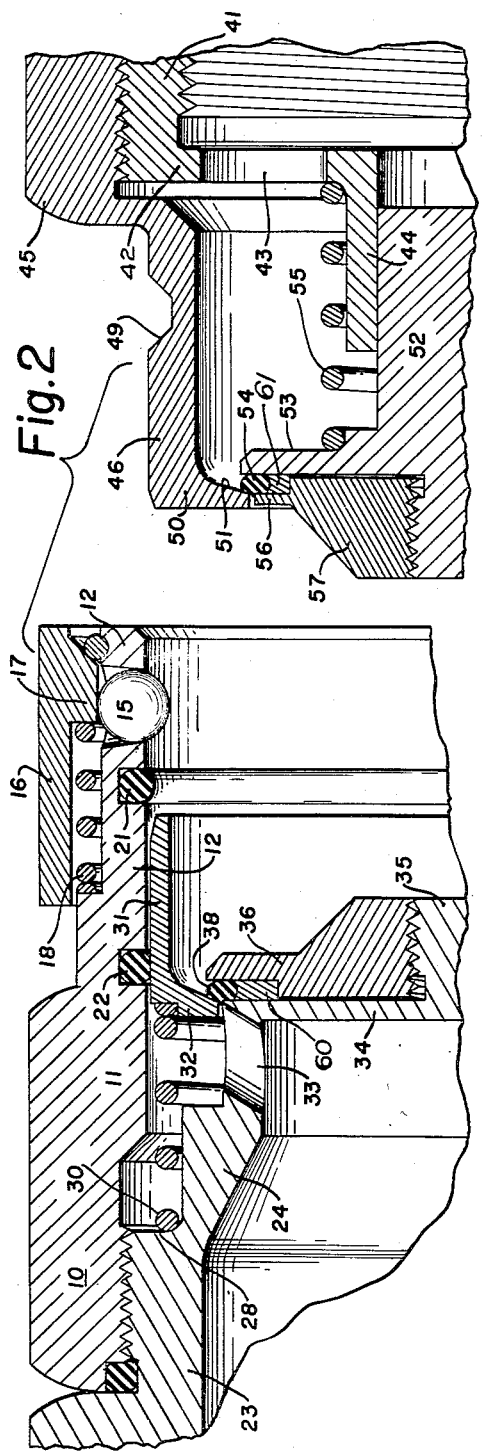
Figure 2 is a similar view of the coupling in uncoupled position.
Figure 3:
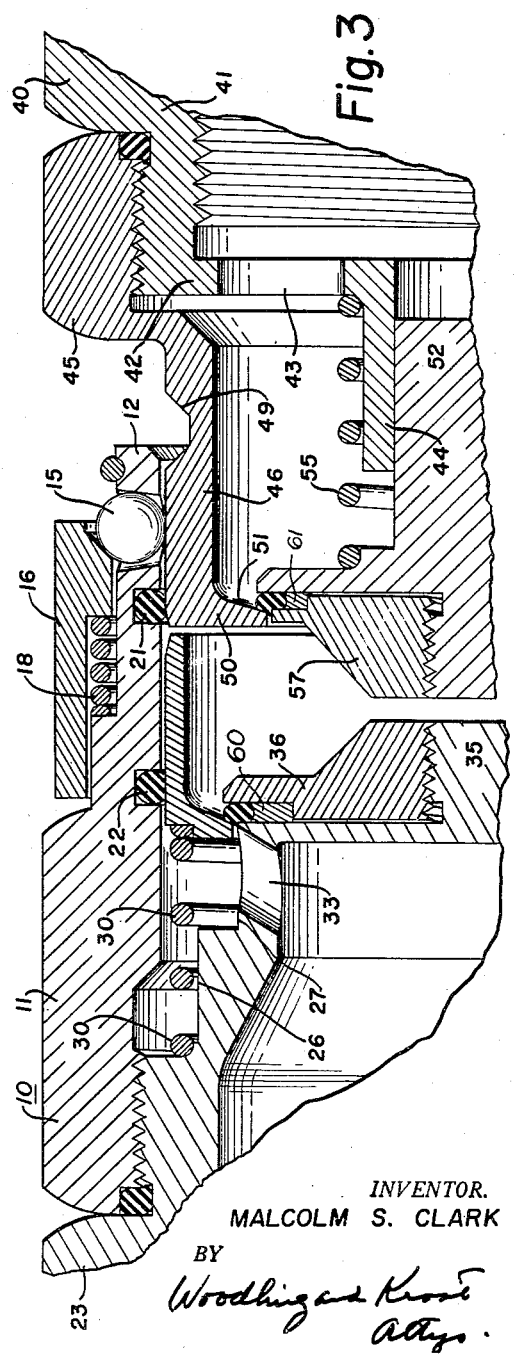
Figure 3 is a similar view of the coupling with its members in the act of being coupled or uncoupled.

Referring now in detail to the drawings, a female member 10 is composed of a casing sleeve 11 having a wrench gripping exterior and which is reduced in diameter at one end 12 to form a spring abutment shoulder 13. This sleeve provides a bore or socket 9 for the insertion of a male member. This end 12 is provided with a plurality of holes 14 each tapered inwardly toward its axis to support the usual latching detents or balls 15. A latching sleeve 16 is provided with a cam portion 17 slidable axially on the reduced end 12 and a compression spring 18 abuts the shoulder formed by the cam portion and the shoulder 13 to bias the latching sleeve 16 to a position where the cam portion 17 normally presses the balls 15 radially inward into latched position. The size of the coupling and its use will determine the number of balls 15 to be used. By axially sliding the sleeve 16, the balls can be unlatched or released. The walls of the socket 9 are provided with a pair of longitudinally spaced grooves 19 and 20, and sealing rubber O-rings 21 and 22 are positioned therein to extend into the bore of the sleeve 11, as shown. It will be observed that the O-ring 21 is placed nearer to the outer end of the socket 9 than the ring 22 for a purpose which will presently be explained.

The end of the female member 11 opposite the end 12 is threaded to receive the enlarged end 23 of a hollow extension member 24 which forms a stationary valve seat. The outer end of the member 24 is formed with a wrench grip and spanner wrench holes. This extension member 24 has its outer end interiorly threaded to receive an adaptor of any desired type for connection with a fluid feed or pipe line, or the end of the adaptor may have an integral barbed extension for a rubber hose as is well understood from my copending application. This extension member 24 is stepped down in diameter in two stages to provide coaxial extensions 26 and 27 terminating in annular shoulders 28 and 29, the former forming an abutment for a compression spring 30 which biases a valve sleeve body 31 toward a valve seat. The end of this sleeve nearest the shoulder 29 is provided with a radially inwardly extending in-turned annular flange 32 which is axially slidable on the extension 27 and when in open position, as shown in Figure 1, uncovers a series of radial lateral ports 33 extending at an angle, as shown, through the extension 27. The outer end of this sleeve 31 may be considered its control portion which is at all times located further inwardly of the socket 9 than the seal 21. This valve sleeve has a much larger bore than that provided by the bore of extension 27, which latter is substantially the same diameter as the fluid line so as not to retard or impede the flow of fluid through the coupling. The side of the in-turned flange 32 nearest the enlarged bore portion forms the surface which engages a valve seat to be presently described. It will be observed that the outer circumference of this valve sleeve compresses and rides upon the sealing ring 22 in all of its operative positions so as to seal against leakage of fluid from the coupling.

The hollow extension 27 is axially closed by an end piece 34 forming part of a stationary valve seat, and this piece 34 has a coaxial reduced threaded extension 35. A disc-like valve seat 36 is threaded upon the extension 35. These members 35 and 36 are adapted to control movement of a valve in the male member and may therefore be considered as a control portion of the female valve seat. The valve seat 36 is larger in diameter than the outer periphery of the extension 27, and its face nearest the extension 27 is recessed to provide an annular groove between the extension 27 and the seat 36. In this recess is placed a separate metal ring 60 having its outer periphery grooved for the bonding of an elastic rubber O-ring 38 therein. This O-ring extends beyond the sides of its mounting ring 60 prior to its assembly in the coupling in order that it may be compressed between the members 27 and 36 to any desired degree. The degree of compressibility of this O-ring is limited by the width of the mounting ring 60 and its metal to metal contact with the members or extension 27 and member 36. As shown, the rubber O-ring 38 extends beyond the outer periphery of the member 27 so as to be in position to be engaged by the flange 32 of the valve sleeve 31. By threading the valve seat 36 toward the extension 27, the O-ring 38 may be clamped in its operative position to engage with the in-turned flange of the valve sleeve 31 when the male and female members are uncoupled or disconnected. It will be obvious that the valve member 36 may be unscrewed from the threaded extension 35 to replace the O-ring 38 and its mounting ring 60. When the two members are uncoupled, the spring 30 automatically moves the valve sleeve 31 to cover the ports 33 and abut against the seat formed by the O-ring 38 to stop any flow of fluid in the female member. In all positions of the valve sleeve 31, it engages the sealing O-ring 22 to preclude leakage from the female member.

The male member 40 of the coupling is composed of an outer annular member having a polygonal exterior surface for a wrench grip, or spanner holes for the insertion of a wrench. This member includes a reduced threaded portion 41 which terminates in a spider member 42 having a series of holes 43 for the passage of fluid and a central tubular axial extension 44 for the mounting of a valve body in the male member. The inner end of the member 40 is exteriorly threaded for the reception thereon of an enlarged wrench or hex end 45 of a nipple or connecting member 46. A rubber O-ring 47 is placed between the members 40 and 45 in complementary grooves as shown to prevent leakage, and a similar O-ring 48 and complementary grooves are provided between the hexagonal portions of the female member 11 and the extension member 24. This nipple or connecting member 46 of the male member is elongated as illustrated and is provided with an annular groove 49 with oppositely beveled side walls to receive the twelve latching balls 15 when the male member is inserted into the female member, such groove being located so as to slightly space the adjacent ends of the male and female members when they are coupled in order to allow freer relative rotary movement of the male and female members. This nipple 46 is made elongated so as to prolong its contact with the sealing ring 21 of the female member during the time the female and male members are being coupled and uncoupled. The free end of this nipple is provided with an in-turned annular flange 50, the inner circumference of which is approximately as large as the inner circumference of the flange 32 of the valve in the female member to allow for full freedom of fluid flow through the coupling. The inner surface 51 of this in-turned flange forms a valve seat for the movable valve body of the male member. This flanged end 50 of the connecting nipple 46 is adapted to engage the control portion of valve sleeve 31 and is therefore termed the control end or portion of the nipple. This male valve body includes a stem portion 52 axially slidable in the axial extension or bearing sleeve 44. A disc-like valve head 53 is carried by the valve stem 52 and is of a diameter larger than the axial opening formed by the in-turned flange 50. The end of this stem 52 is threaded to receive a nut 57, which has it face, next to the valve head 53, recessed as shown to provide a flange 56 of less diameter than the head 53. A metal ring 61 has its outer periphery grooved for the bonding of an elastic rubber O-ring 54, and these two members cooperate with the valve body 53 and nut 57 in the same manner that the ring 60 and rubber O-ring 38 cooperate with the members 27 and 36. For biasing the valve head 53 toward its seat 51, a compression spring 55 is mounted on the axial extension or bearing sleeve 44 to engage a shoulder thereon and also to engage the valve head 53. The outer end of the stem 52 and nut 57 is the control portion of the male valve 53, since it is adapted to engage the control end of the female valve seat member 36 to control the movement of the valves. The flange 56 of the nut 57, is of course, made of such diameter that it will pass through the axial opening in the in-turned flange 50 with minimum clearance to allow the O-ring 54 to firmly engage the seat 51 under the influence of the spring 55 when the male and female members are disconnected.

To disconnect the male and female members from the position shown in Figure 1, the latching sleeve 16 is moved axially to compress the spring 18 and allow the latching balls 15 to move radially outwardly as the male member is being withdrawn from the socket of the female member. During this time, the abutment of the members 36 and 57 is relieved to allow the male valve 53 to start closing, and the female valve sleeve 31 to also start closing under the influence of the spring 30. During further separation of the coupling members, their two valves come to a closed or seating position before the nipple 46 disengages the sealing ring 21, with the result that the pressure of fluid in the coupling is cut off so that when these two members are being uncoupled or are entirely uncoupled or disconnected there will be no force of fluid causing it to be sprayed or forcibly ejected from the coupling member. At the same time, this action will reduce to a minimum, the amount of spillage from the coupling members when they are disconnected.

From the foregoing, it will also be apparent that when the male and female members are being coupled or connected, the nipple 46 of the male member will seal on the sealing ring 21 of the female member prior to any opening of the valves of the two members so as to prevent the pressure of the fluid from being ejected or sprayed from the exterior of the coupling. As the male nipple 46 is further inserted into the socket of the female member, it will engage with the valve sleeve 31 of the female member to unseat the same, and the nut 57 or stem 52 of the male valve body will engage the valve member 36 or extension 35 to cause unseating of the O-ring 54 of the male valve body from its seat 51, thereby opening the two members of the coupling to free passage of the fluid under pressure through the coupling. At this time, the latching balls 15 will be held seated in the groove 49 of the male nipple by the cam portion 17 of the latching sleeve 16.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A detachable coupling comprising a male and female member, said female member including a socket with an open coupling end, said female member having a hollow extension member threadably secured thereto and extending coaxially into said socket in spaced relation to the peripheral wall of said socket to define an annular chamber, said hollow extension member terminating in a valve seat spaced a distance axially inwardly from said open end of said socket, said hollow extension member having on the outer surface thereof first and second reduced portions defining first and second abutment shoulders, wall means defining ports extending through said hollow extension member from the interior thereof to said annular chamber, a movable valve sleeve comprising wall means slidably mounting same within said annular chamber, said movable valve sleeve having an inwardly extending annular flange surrounding said extension member and slidable on said first reduced portion, said valve seat on said extension member including a flange portion integrally formed with said extension member, said extension member having a threaded end portion, a nut threadably mounted on said threaded end portion of said extension member and having an annular flange adjoining said flange portion, a metal ring between said annular flange and flange portion and having a rubber O-ring bonded on the periphery thereof, said metal and rubber rings being clamped between said annular flange and flange portion with said metal ring limiting the compressibility of said rubber ring, said inwardly extending annular flange of said movable valve sleeve being engageable with said rubber O-ring, a spring mounted upon said second reduced portion and engaging said second abutment shoulder and said movable valve sleeve to urge said annular flange of said valve sleeve into engagement with said rubber O-ring, a first sealer ring mounted on the wall of said socket near said first valve seat and engaging the outer wall of said valve sleeve, a second sealer ring mounted on the walls of said socket between said first sealer ring and said open coupling end of said socket, said second sealer ring being located closer to said open coupling end of said socket than said elements of said valve seat of said female member, said male member having a fixed coaxial connecting portion provided with an inwardly extending annular flange forming a valve seat and adapted for insertion into said socket of said female member to couple said male and female members together, latching mechanism for latching said male and female members in coupled position, said male member including a tubular supporting extension extending axially into said connecting portion, a valve stem slidably guided in said tubular extension and having an enlarged valve head to abut said tubular extension when said valve is in said open position, said enlarged valve head including a flange portion integrally formed with said valve stem, said valve stem having a threaded end portion, a nut mounted on said threaded end portion of said valve stem and having an annular flange adjoining said flange portion, a metal ring between said annular flange and flange portion and having a rubber O-ring bonded on the periphery thereof, said metal and rubber rings being clamped between said annular flange and flange portion with said metal ring limiting the clamping of said rubber ring, a spring mounted upon said tubular extension and abutting said valve head to bias same toward said seat, insertion of said connecting portion of said male member into said socket of said female member causing same to engage said movable valve sleeve and move said valve sleeve off of said valve seat on said extension member and into engagement with said first abutment shoulder, and insertion of said male member causing said valve stem to engage said extension member to move said valve head of said male member off of its seat.

2. A detachable coupling comprising a male and female member, said female member including a socket with an open coupling end, said female member having a hollow extension member secured thereto and extending coaxially into said socket in spaced relation to the peripheral wall of said socket to define an annular chamber, said hollow extension member terminating in a valve seat spaced a distance axially inwardly from said open end of said socket, said hollow extension member having on the outer surface thereof first and second portions defining first and second abutment shoulders, wall means defining ports extending through said hollow extension member from the interior thereof to said annular chamber, a movable valve sleeve comprising wall means slidably mounting same within said annular chamber, said movable valve sleeve having an inwardly extending annular flange surrounding said extension member and slidable on said first reduced portion, said valve seat on said extension member including a flange portion formed on said extension member, said extension member having a threaded end portion, a nut threadably mounted on said threaded end portion of said extension member and having an annular flange adjoining said flange portion, a metal ring between said annular flange and flange portion and having a rubber ring on the periphery thereof, said metal and rubber rings being clamped between said annular flange and flange portion with said metal ring limiting the relative movement of said flanges, said inwardly extending annular flange of said movable valve sleeve being engageable with said rubber ring, a spring mounted upon said second reduced portion and engaging said second abutment shoulder and said movable valve sleeve to urge said annular flange of said valve sleeve into engagement with said rubber ring, a first sealer ring mounted on the wall of said socket near said first valve seat and engaging the outer wall of said valve sleeve, a second sealer ring mounted on the walls of said socket between said first sealer ring and said open coupling end of said socket, said second sealer ring being located closer to said open coupling end of said socket than said elements of said valve seat of said female member, said male member having a fixed coaxial connecting portion provided with an inwardly extending annular flange forming a valve seat and adapted for insertion into said socket of said female member to couple said male and female members together, latching mechanism for latching said male and female members in coupled position, said male member including a tubular supporting extension extending axially into said connection portion, a valve stem slidably guided in said tubular extension and having an enlarged valve head to abut said tubular extension when said valve is in said open position, said enlarged valve head including a flange portion formed on said valve stem, said valve stem having a threaded end portion, a nut mounted on said threaded end portion of said valve stem and having an annular flange adjoining said flange portion, a metal ring between said annular flange and flange portion and having a rubber ring bonded on the periphery thereof, said metal and rubber rings being clamped between said annular flange and flange portion with said metal ring limiting the relative movement of said flanges, a spring mounted upon said tubular extension and abutting said valve head to bias same toward said seat, insertion of said connecting portion of said male member into said socket of said female member causing same to engage said movable valve sleeve and move said valve sleeve off of said valve seat on said extension member and into engagement with said first abutment shoulder and insertion of said male member causing said valve stem to engage said extension member to move said valve head of said male member off of its seat.

References Cited in the file of this patent

UNITED STATES PATENTS

| 2,461,700 | Scheiwer | Feb. 15, 1949 |
| 2,548,528 | Hansen | Apr. 10, 1951 |
| 2,648,548 | Scheiwer | Aug. 11, 1953 |

FOREIGN PATENTS

| 537,654 | Great Britain | July 1, 1941 |
| 548,010 | Great Britain | Sept. 21, 1942 |
| 627,400 | Great Britain | Aug. 8, 1949 |